(12) United States Patent
Resch

(10) Patent No.: US 11,097,777 B2
(45) Date of Patent: Aug. 24, 2021

(54) LANE-CHANGE ASSISTANCE SYSTEM AND LANE-CHANGE ASSISTANCE METHOD FOR THE AUTOMATED PERFORMANCE OF MULTIPLE LANE CHANGES

(71) Applicant: Bayerische Motoren Werke Aktiengesellschaft, Munich (DE)

(72) Inventor: Christoph Resch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 215 days.

(21) Appl. No.: 16/254,693

(22) Filed: Jan. 23, 2019

(65) Prior Publication Data

US 2019/0152525 A1     May 23, 2019

Related U.S. Application Data

(63) Continuation of application No. PCT/EP2017/069786, filed on Aug. 4, 2017.

(30) Foreign Application Priority Data

Aug. 29, 2016   (DE) .................... 10 2016 216 135.0

(51) Int. Cl.
*B62D 15/02*     (2006.01)
*G01C 21/34*     (2006.01)
(Continued)

(52) U.S. Cl.
CPC ......... *B62D 15/0255* (2013.01); *G01C 21/34* (2013.01); *B60Q 1/343* (2013.01); *B60Q 1/40* (2013.01)

(58) Field of Classification Search
CPC .... B62D 15/0255; G01C 21/34; B60Q 1/343; B60Q 1/40
See application file for complete search history.

(56) References Cited

U.S. PATENT DOCUMENTS

2005/0155808 A1*  7/2005  Braeuchle .......... B62D 15/0255
                                                180/402
2012/0123672 A1   5/2012  Kojima et al.
(Continued)

FOREIGN PATENT DOCUMENTS

CN    1576792 A    2/2005
CN    1707224 A   12/2005
(Continued)

OTHER PUBLICATIONS

International Search Report (PCT/ISA/210) issued in PCT Application No. PCT/EP2017/069786 dated Nov. 7, 2017 with English translation (five (5) pages).
(Continued)

*Primary Examiner* — Aniss Chad
*Assistant Examiner* — Ali Wahab
(74) *Attorney, Agent, or Firm* — Crowell & Moring LLP

(57) ABSTRACT

A lane-change assistance system for a motor vehicle performs a plurality of lane changes from the current lane to a target lane, which are required in order to follow a navigation system outputted route. The plurality of lane changes is performed in response to the lane-change assistance system ascertaining a triggering operation action by the driver, which indicates that the driver wants the lane-change assistance system to perform the plurality of lane changes.

11 Claims, 5 Drawing Sheets

(51) Int. Cl.
    *B60Q 1/34*     (2006.01)
    *B60Q 1/40*     (2006.01)

(56) References Cited

U.S. PATENT DOCUMENTS

| | | |
|---|---|---|
| 2013/0103304 A1 | 4/2013 | Nishibashi et al. |
| 2017/0305465 A1 | 10/2017 | Mielenz |
| 2017/0320521 A1 | 11/2017 | Fujita |
| 2017/0341653 A1* | 11/2017 | Kubota ........... B60W 30/18154 |
| 2018/0211533 A1* | 7/2018 | Nakajima ........... G01C 21/3492 |

FOREIGN PATENT DOCUMENTS

| | | |
|---|---|---|
| CN | 105835886 A | 8/2016 |
| DE | 100 12 737 A1 | 9/2001 |
| DE | 102 10 723 A1 | 9/2003 |
| DE | 10 2005 050 662 A1 | 4/2007 |
| DE | 10 2008 062 206 A1 | 9/2009 |
| DE | 11 2010 005 785 T5 | 6/2013 |
| DE | 10 2014 222 836 A1 | 5/2016 |
| WO | WO 2014/016486 A2 | 1/2014 |
| WO | WO 2016/063383 A1 | 4/2016 |

OTHER PUBLICATIONS

German-language Written Opinion (PCT/ISA/237) issued in PCT Application No. PCT/EP2017/069786 dated Nov. 7, 2017 (five (5) pages).

German-language Search Report issued in counterpart German Application No. 10 2016 216 135.0 dated May 3, 2017 with partial English translation (11 pages).

Chinese Office Action issued in Chinese application No. 201780037455.2 dated Apr. 21, 2021, with English translation (Fifteen (15) pages).

* cited by examiner

Fig. 5B
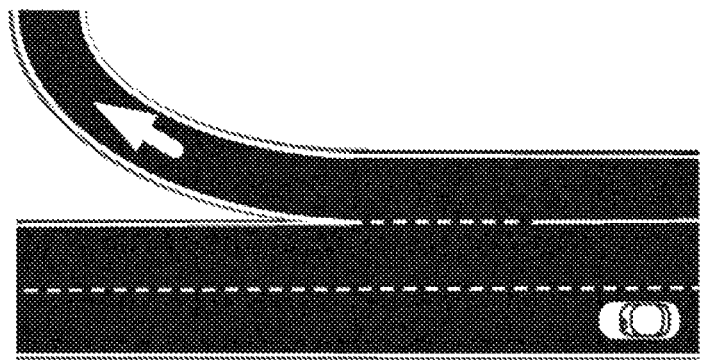
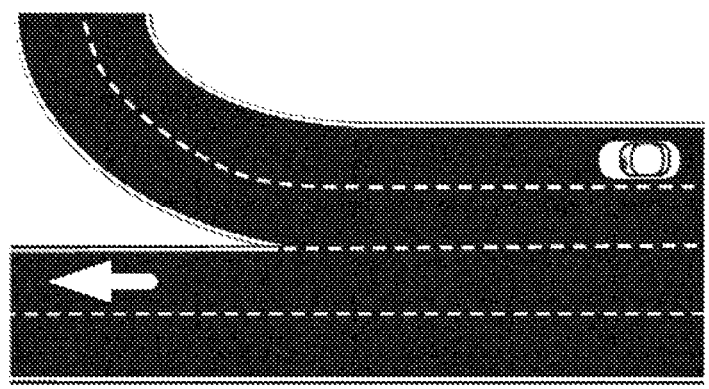
Fig. 5A

LANE-CHANGE ASSISTANCE SYSTEM AND LANE-CHANGE ASSISTANCE METHOD FOR THE AUTOMATED PERFORMANCE OF MULTIPLE LANE CHANGES

CROSS REFERENCE TO RELATED APPLICATIONS

This application is a continuation of PCT International Application No. PCT/EP2017/069786, filed Aug. 4, 2017, which claims priority under 35 U.S.C. § 119 from German Patent Application No. 10 2016 216 135.0, filed Aug. 29, 2016, the entire disclosures of which are herein expressly incorporated by reference.

BACKGROUND AND SUMMARY OF THE INVENTION

The invention relates to a lane-change assistance system for a motor vehicle for performing lane changes with at least automated transverse guidance. Provision is preferably made for the longitudinal guidance also to be performed by the system in an automated manner besides the transverse guidance. Furthermore, the invention relates to a corresponding lane-change assistance method.

In known lane-change assistance systems having an automated lane-change function, the driver typically indicates a desire to change lanes by means of a deliberate operation action, whereupon the vehicle follows a trajectory planned by the system to the adjacent lane with automated transverse guidance and generally also with automated longitudinal guidance. In such lane-change assistance systems, a driver's desire to change lanes is typically signaled by actuation of an operating element, for example of a turn signal lever for triggering a travel direction indicator visible from outside the vehicle.

One exemplary lane-change assistance system is described in the document DE 102 10 723 A1. To trigger the lane-change process, the driver has to actuate a turn signal lever and continue to actuate it permanently during the first half of the lane-change process (i.e. until the vehicle crosses the boundary with respect to the neighboring lane), otherwise the lane change is aborted.

Known lane-change assistance systems generally monitor the vehicle environment, in particular the surrounding traffic, by means of a suitable environment sensor system before the lane-change maneuver. In response to an operation action by the driver, e.g. an actuation of the turn signal lever, the vehicle automatically changes lane if it has been recognized by means of the sensor system that the lane change is able to be performed without danger.

In a first generation of such lane-change assistance systems, the driver is responsible for an accident-free lane change, that is to say that the driver must monitor the surrounding traffic despite the environment sensor system. In a later stage of development, the driver need no longer monitor the vehicle environment and the driver then also no longer bears responsibility for the accident-free lane change.

In addition, purely indicating driver assistance systems are known, which indicate to the driver during active navigation using a navigation system a necessary lane change which is necessary in order to follow the current navigation. For this purpose, the driver assistance system identifies the lane which the vehicle is currently in and the lane to which it is necessary to change in order to follow the active navigation and reach the navigation destination.

What is disadvantageous about known lane-change assistance systems is that they are complicated to operate by the driver in complex lane-change situations with a plurality of required lane changes to be performed successively.

It is therefore an object of the invention to provide a lane-change assistance system and a corresponding lane-change assistance method which are distinguished by improved operating convenience in complex lane-change situations with a plurality of required lane changes to be performed successively.

The object is achieved by means of the features of the independent patent claims. Advantageous embodiments are described in the dependent claims. It is pointed out that additional features of a patent claim dependent on an independent patent claim, without the features of the independent patent claim or only in combination with a subset of the features of the independent patent claim, can form a dedicated invention which is independent of the combination of all the features of the independent patent claim and which can be made the subject matter of an independent claim, of a divisional application or of a subsequent application. This applies in the same way to technical teachings which are described in the description and which can form an invention that is independent of the features of the independent patent claims.

A first aspect of the invention relates to a lane-change assistance system for a motor vehicle for the automated performance of a lane change with at least automated transverse guidance. It is advantageous if, in addition, the longitudinal guidance is also performed in an automated manner in the context of the lane change. The assistance system is configured to ascertain, on the basis of information from a navigation system for navigation, that a plurality of lane changes proceeding from the current lane to a target lane are required in order to follow the navigation. The lane-change assistance system preferably knows which lane the ego vehicle is currently in and the target lane to which it is necessary to change in order to follow the active navigation.

The driver assistance system is furthermore configured to inform the driver of a need to change lanes (i.e. a lane-change indication is carried out). This is carried out for example optically, acoustically and/or haptically. The lane-change assistance system informs the driver of the need to change lanes for example in such a way that the multiple lane changes required are signaled (as identifiable in their number) to the driver. By way of example, a current lane and a target lane to which it is necessary to change with a plurality of lane changes in succession on account of the active navigation are marked schematically on a display device in the vehicle cockpit or in a head-up display. Informing of a need to change lanes may also consist in indicating an exit to be taken from the interstate or expressway currently being traveled, without the individual lane changes required being signaled to the driver in this case.

By way of a triggering operation action by the driver, the driver can indicate that he/she wants to perform the required number of lane changes in order to follow the active navigation. The driver assistance system checks whether such a triggering operation action by the driver for triggering the multiple lane changes required is present. The triggering operation action is preferably an actuation of a turn signal lever corresponding to the direction of the lane changes required. However, the actuation of a dedicated operating element provided only for the lane-change function, or the actuation of a multifunctional rotary/pushbutton switch in the center console is also contemplated. The triggering operation action need not be the actuation of an operating element. Alternatively, it is also possible to provide an operating gesture which is assigned to the triggering of the multiple lane changes and which is identified for example by the evaluation of the video image of an interior camera. Alternatively, an assigned voice command may be spoken by the driver as a triggering operation action, which voice command is identifiable as such by use of a microphone and corresponding audio signal processing.

If it is ascertained that the triggering operation action by the driver is present, the plurality of lane changes required are performed successively proceeding from the current lane to a target lane with at least automated transverse guidance in an automated manner on the part of the lane-change assistance system. In this case, the assistance system preferably monitors the vehicle environment, in particular the traffic, using one or more suitable sensor systems. By way of example, if it has been ascertained on the basis of environment information that there is an impermissible high risk of an accident in relation to the first lane change, the first lane change and also the subsequent lane changes are not triggered at all or are not triggered until later when the risk of an accident is sufficiently low again.

In the case of the lane-change assistance system according to the invention, therefore, in response to an operation action by the driver, as many lane changes as are necessary in order to follow the current navigation to the navigation destination are performed in an automated manner. This has the advantage that in complex lane-change situations with a plurality of lane changes to be performed directly in succession in order to reach a target lane that is not directly adjacent to the starting lane, the driver can trigger the plurality of lane changes required by way of an assigned driver operation action.

In a first stage of development, it may be provided that in this case the driver is still responsible for monitoring the vehicle environment, in particular the surrounding traffic. In particular, the driver is responsible for monitoring the traffic behind, in particular with regard to rapidly overtaking vehicles. In a further stage of development, it may be provided that the driver is no longer responsible for monitoring the vehicle environment, rather that the vehicle can completely monitor the situation by means of the environment sensor system present and/or by communication with the surrounding traffic, without the driver being needed for this.

The lane-change assistance system preferably serves not only for performing lane changes in an automated manner, but also for automated lane keeping with automated transverse and longitudinal guidance. Before the automated lane changes are performed, automated transverse and longitudinal guidance is preferably already active in order to keep to the current lane in an automated manner. In the context of automated transverse guidance, by way of example, the vehicle is kept in the middle of the lane by control of the steering. For automated longitudinal guidance, a cruise control system can be provided. In convoy travel behind a vehicle traveling ahead, the cruise control system regulates the distance to the vehicle traveling ahead. In free travel without distance regulation with respect to a vehicle traveling ahead, by contrast, the cruise control system regulates the vehicle speed to a set speed that was set by the driver, for example.

It is advantageous if, directly after the signaling of the information about the need for the lane change, only a single operation action is required for triggering and performing the plurality of lane changes. Alternatively, however, it is also contemplated that, in response to the information, a plurality of operation actions must be carried out in order to trigger the multiple lane changes. In this case, however, the number of operation actions is preferably not dependent on the number n (where n>1) of required lane changes. By way of example, it may be provided that the turn signal lever, independently of the number n of required lane changes, generally has to be actuated twice in order then to trigger the multiple lane changes. However, it is also contemplated that in the case of n required lane changes for following the active navigation, the turn signal lever has to be actuated exactly n times in order that the n lane changes are then triggered.

It may be provided that the triggering operation action must still be continued after triggering the first lane change of the multiple lane changes in order that the lane change is not aborted, for example. By way of example, it may be provided that the triggering operation action is holding the turn signal lever in the so-called one-touch turn signal position, wherein the turn signal lever must be held in the one-touch turn signal position for example for a specific minimum time duration (e.g. 1 s) after the beginning of the first lane-change process in order that the first lane-change process begun is not aborted. For the case where the triggering operation action must still be continued after the triggering of the first lane change of the multiple lane changes, the system is preferably configured, however, such that the triggering operation action for triggering all lane changes required can already be ended on the part of the driver before the conclusion of the first lane change (for example upon crossing the lane boundary between the starting lane and the adjacent lane).

The lane-change assistance system is preferably configured, in response to an operation action of the driver, to perform an individual lane change in an automated manner, for example upon the turn signal lever being switched from the rest position to the one-touch turn signal position.

Preferably, the operation action for the automated performance of the multiple lane changes required on account of the navigation is different than the operation action for the automated performance of a single lane change (for example switching to the engaged position in contrast to switching to the one-touch turn signal position).

Informing the driver is preferably triggered in reaction to the system ascertaining that a plurality of lane changes are required for following the navigation. However, it is also contemplated for the system to ascertain, depending on information from a navigation system, that for example an exit ahead must be taken and, depending thereon, for the driver to be informed of a need to change lanes. The system then ascertains only later, for example, that a plurality of lane changes proceeding from the current lane to a target lane are required (for example after the driver has performed a triggering operation action).

By way of example, a travel direction indicator operating element for activating a travel direction indicator visible from outside the vehicle is provided in the vehicle cockpit, wherein the triggering operation action by the driver for triggering the multiple lane changes is an actuation of the travel direction indicator operating element.

By way of example, the travel direction indicator operating element is a turn signal lever realized as a steering column switch. A turn signal lever of this type generally has a rest position for a non-activated travel direction indicator and an engaged position, in which the travel direction indicator is permanently activated, without the turn signal lever having to be held by the driver. Before the engaged position, generally a one-touch turn signal position is provided, in which the travel direction indicator is activated and returns to the rest position upon the turn signal lever being released.

The triggering operation action for triggering the multiple lane changes is, for example, switching the turn signal lever from the rest position to the engaged position.

Alternatively, it may be provided that, for performing the multiple lane changes, the turn signal lever must be moved from the rest position to the one-touch turn signal position. In this case, it is preferably provided that the turn signal lever in the one-touch turn signal position must be held in the one-touch turn signal position at least for as long as until a specific criterion is satisfied. If the criterion is not satisfied, the multiple lane changes are not triggered or a lane change that has already been begun is aborted.

By way of example, the turn signal lever for triggering the multiple lane changes must be held in the one-touch turn signal position for a time duration greater than, or greater than or equal to, a time duration threshold value (e.g. 1 s) or for a traveled distance greater than, or greater than or equal to, a traveled distance threshold value (e.g. 40 m). Alternatively or additionally, it may also be provided that the turn signal lever must be held in the one-touch turn signal position until a specific criterion with regard to the maneuvering progress must be satisfied (e.g. reaching or crossing the lane boundary), since otherwise the multiple lane changes are aborted again.

One preferred application of the lane-change assistance system according to the invention is that of following an exit, for example on an interstate or an expressway. In this case, the lane-change assistance system is configured to ascertain that, proceeding from the current lane, a plurality of lane changes are required on account of an exit ahead that is to be taken in the context of the navigation. The assistance system makes it possible for the lane changes required to reach the exit to be performed in an automated manner in reaction to the triggering operation action by the driver.

A local lane-change cause which is an alternative to an exit and which may necessitate multiple lane changes is, for example, a lane separation ahead or an end of lane ahead. A use of the lane-change assistance system according to the invention can be provided for these applications as well.

A distance-related or temporal distance with respect to a lane-change cause ahead, in particular with respect to an exit ahead that is to be taken, can be determined or be received from a navigation system, wherein the lane-change assistance system preferably informs the driver of the need for the lane change depending on this distance. By way of example, if a specific distance to the exit is reached or undershot, the driver is informed of the lane changes required. By way of example, it is possible to determine or receive a distance up to which all n lane changes required or only a portion of these n lane changes (e.g. n–1 lane changes in the case of an exit with a deceleration lane) should be performed in order to follow the navigation destination (specifically the exit).

The distance with respect to the local lane-change cause may be the distance to said local lane-change cause, for example the distance to the exit. The distance to the exit may be for example the distance to the beginning of a deceleration lane of the exit.

Preferably, the driver assistance system is configured to ascertain the current lane, wherein then preferably the point in time or the vehicle position at which the lane-change assistance system informs of the need for the lane change is dependent on the current lane. By way of example, if the vehicle is on a three-lane interstate having three lanes per direction of travel and the vehicle is initially in the outer overtaking lane, the driver is informed of the lane changes before an exit at a time earlier than if the vehicle is initially in the lane adjacent to the exit or the middle lane, since more lane changes are needed in the first-mentioned case.

Preferably, the assistance system knows both the lane in which the ego vehicle is situated and the lane to which it is necessary to change in order to follow the navigation destination.

By way of example, depending on the current lane, it is possible to determine a number of lane changes to be performed proceeding from the current lane, wherein the point in time or the vehicle position at which the lane-change assistance system informs of the need for the lane change is dependent on this number. In this case, under otherwise identical preconditions, the driver is informed of the lane changes preferably all the earlier before the local lane-change cause, the higher the number of lane changes. This makes it possible to ensure that the driver is informed early enough in order that the number of lane changes can be performed in an automated and timely manner in reaction to the operation action by the driver.

The number of lane changes to be performed proceeding from the lane currently being traveled can be the number of lane changes to reach the lane of the exit or—in the case of an additional lane for the exit (e.g. a deceleration lane)—to reach that lane which is adjacent to the lane of the exit. The number of lane changes to be performed therefore need not correspond to the total number of lane changes to be performed, but rather can also be smaller by one, for example.

It is advantageous if the lane-change assistance system is configured to determine information about the traffic volume of the surrounding traffic, and then to define the point at which the driver is informed of the necessary lane change depending on the information about the traffic volume. In a simple stage of development, the traffic volume of the surrounding traffic can be determined for example by observing the surrounding objects for a relatively long period by means of an on-board sensor system such as a camera, radar sensors, laser scanner, etc. In a further stage of development, it is contemplated for the surrounding road users in a defined area to communicate their respective position and speed to the ego vehicle by means of vehicle-to-vehicle communication, from which the ego vehicle can calculate/estimate the current traffic volume. In this case, however, the communication need not necessarily take place from vehicle to vehicle. Rather, it is also possible for any vehicle to transmit its data to a backend server system in which the traffic analysis is then performed and which then passes on the information about the traffic volume to other road users.

By way of example, if there is a high traffic volume, the process of informing the driver is preferably initiated earlier before a lane-change cause ahead (e.g. an exit) compared with the situation if, under otherwise identical preconditions, there is a low traffic volume in comparison therewith. This takes account of the concept that when there is a high traffic volume, the system requires more time for the necessary lane changes and should therefore be informed of the required lane changes correspondingly earlier. By way of example, the number of necessary lane changes is determined and the average time for a lane change is determined depending on the information about the traffic volume, such that the expected time for all lane changes required can be calculated. Depending on this, it is then possible to define the point when or where the driver is informed of the need to change lanes.

A second aspect of the invention relates to a lane-change assistance method for a motor vehicle for the automated performance of a lane change with at least automated transverse guidance. In accordance with the method, on the basis of information from a navigation system for navigation, it is ascertained that a plurality of lane changes proceeding from the current lane to a target lane are required in order to follow the navigation. The driver is informed of a need to change lanes. A check is made to establish whether a triggering operation action by the driver for triggering the multiple lane changes required is present. In reaction to ascertaining the presence of the triggering operation action, the plurality of lane changes required are performed in an automated manner proceeding from the current lane to the target lane.

The above explanations concerning the lane-change assistance system according to the invention in accordance with the first aspect of the invention are also applicable, mutatis mutandis, to the lane-change assistance method according to the invention in accordance with the second aspect of the invention. Advantageous exemplary embodiments of the lane-change assistance method according to the invention that are not explicitly described at this juncture and in the patent claims correspond to the advantageous exemplary embodiments of the lane-change assistance system according to the invention that are described above or described in patent claims.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 5A-5B show exemplary use scenarios.

DETAILED DESCRIPTION OF THE DRAWINGS

Figure 1:
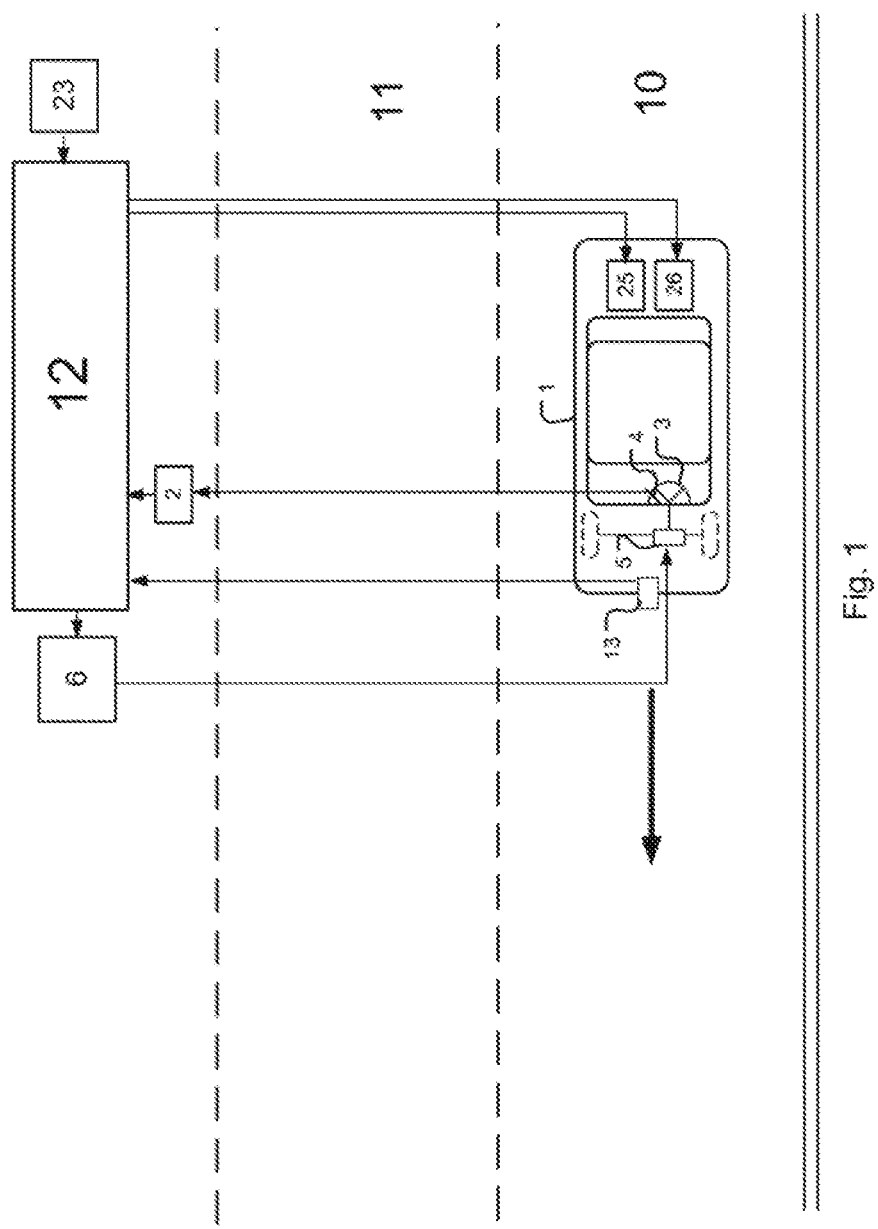
FIG. 1 is a schematic diagram of an exemplary automobile with one exemplary embodiment of a lane-change assistance system according to the invention.

FIG. 1 illustrates an exemplary automobile 1 moving in the direction of the arrow in a starting lane 10 with one exemplary embodiment of a driver assistance system 12 integrated in the vehicle. The starting lane 10 is for example an overtaking lane on an interstate having three lanes per direction of travel. In addition to the direction of travel, the arrow illustrated also marks the lane center of the lane 10.

The vehicle comprises a steering wheel 3 for manually steering the vehicle 1 and a turn signal lever 4 integrated in particular in the steering column. The turn signal lever 4 can be in the neutral position, in one of the two one-touch turn signal positions for a lane change left or right or in one of the two engaged continuous turn signal positions left or right.

Operating electronics 2 serve to detect the position of the turn signal lever 4 and forward the position of the turn signal lever 4 to the driver assistance system 12.

Furthermore, provision is made of electromechanical steering with a steering actuator 5 with an electric motor, which is controlled via an electronic steering control unit 6.

Furthermore, an environment sensor system with front camera 13 is present, the camera image from said front camera being evaluated in a camera evaluation facility. By means of the camera image from the front camera, in the camera evaluation facility of the driver assistance system 12, the lateral boundary lines of the current lane 10 can be measured and the adjacent lane 11 can be identified and measured. This lane information is used in the driver assistance system 12.

The environment sensor system 13 comprises, besides the front camera, a radar system for detecting other road users. For detecting lateral objects, provision can be made of radar sensors that are situated at the four corners of the vehicle and look laterally toward the front and back on the left and right.

The driver assistance system 12 serves, inter alia, to keep the vehicle in a transverse position relative to the current lane 10 in an automated manner (lane keeping function). For this purpose, the steering control unit 6 is controlled in a suitable manner on the part of the driver assistance system 12 in the context of the automated transverse guidance. The driver assistance system 12 also serves for the automated longitudinal guidance of the motor vehicle 1. During the active lane keeping function, the automated longitudinal guidance works like a cruise control. For the automated longitudinal guidance, the driver assistance system 12 controls both the drive torque of the vehicle drive 25 and a possibly required braking torque of the operating braking system 26.

The driver assistance system 12 additionally also comprises a lane-change assistance function. By means of the lane-change assistance function, in reaction to a triggering actuation of the turn signal lever 4, the vehicle 1 is controlled in an automated manner in the context of an automated lane-change maneuver with automated transverse and longitudinal guidance proceeding from the current lane 10 to a directly adjacent target lane (e.g. the lane 11). By way of example, an automated lane change is triggered if the turn signal lever 4 is held in a one-touch turn signal position for a time duration greater than, or greater than or equal to, a threshold value (e.g. 1 s). During the automated lane-change maneuver, both the transverse guidance and the longitudinal guidance are undertaken by the driver assistance system 12.

Furthermore, a navigation system 23 for navigation is provided. During active navigation, the navigation system 23 informs the driver assistance system 12, inter alia, with information regarding the nearest interstate exit ahead which is on the navigation route.

If the driver assistance system 12, with knowledge of the current lane 10 and the target lane, ascertains that one or more lane changes are required in order to follow an exit ahead that is to be taken in the context of the navigation, the driver is informed of the lane changes by a display in the vehicle cockpit or by way of a head-up display. By means of a suitable triggering operation action, e.g. switching the turn signal lever 4 to the engaged position, the driver can then trigger automated performance of the lane changes required.

Figure 2:
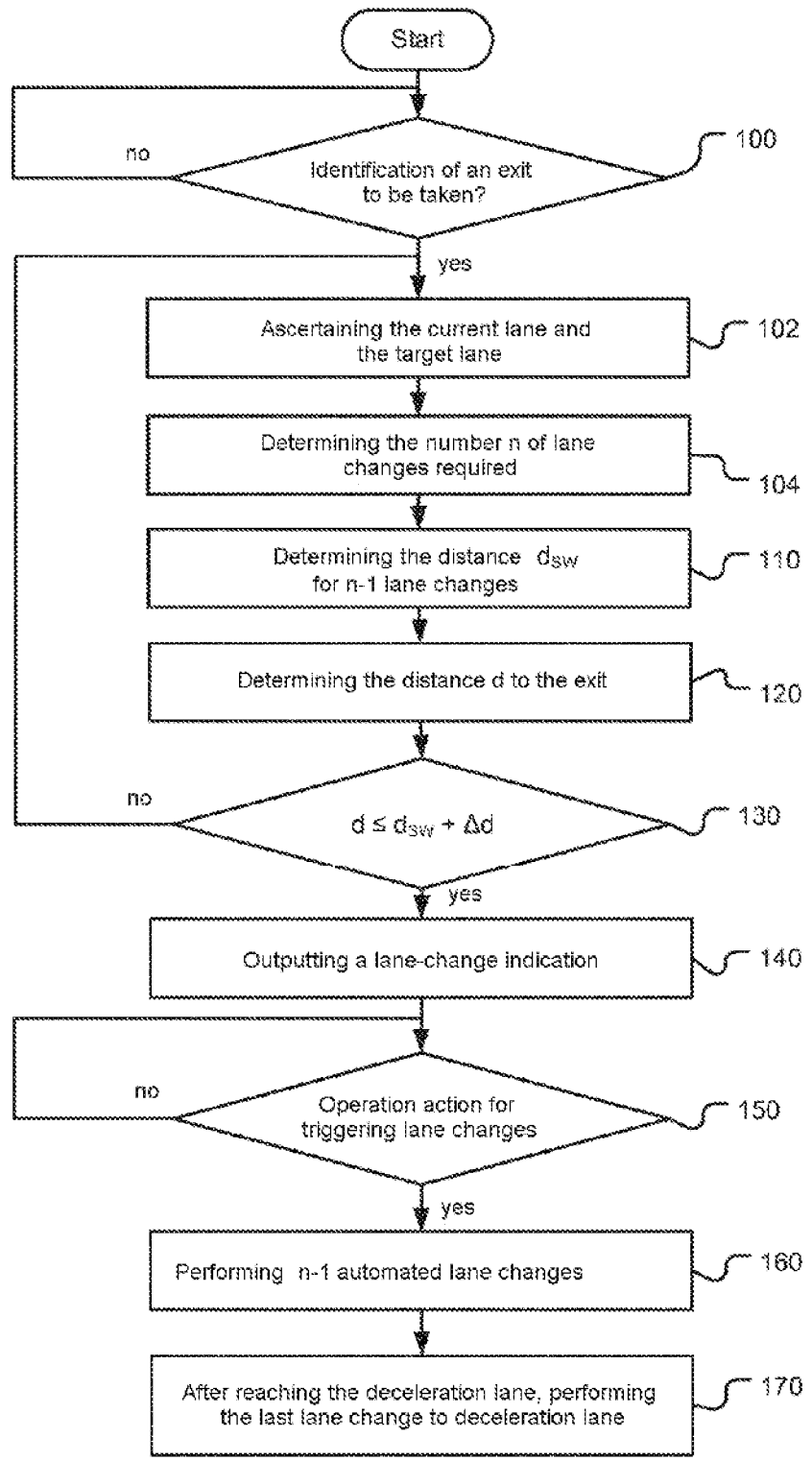
FIG. 2 is an exemplary flow diagram for the automated performance of a plurality of lane changes for following an exit ahead.

The functioning of the driver assistance system 12 when performing automated lane changes in the case of an exit ahead is described below in association with FIG. 2 and FIG. 3.

Figure 3:
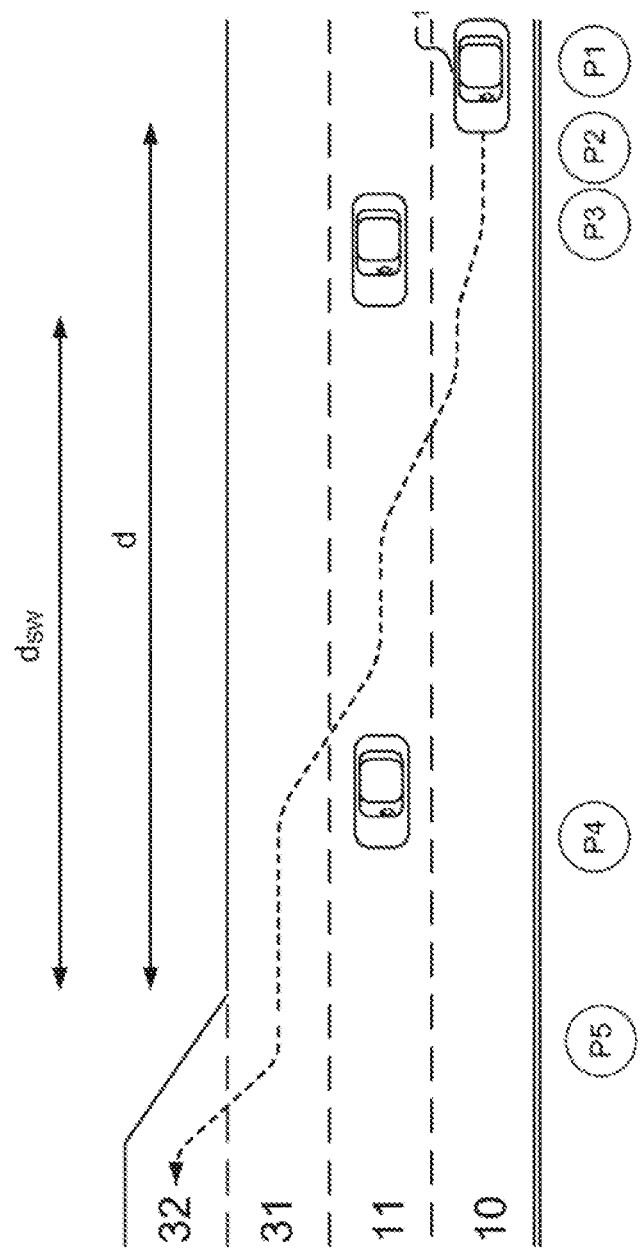
FIG. 3 shows an exemplary traveling sequence.

It is assumed, for example, that the vehicle 1 is initially traveling at high speed in the left lane 10 of a, for example, three-lane interstate with active automated transverse and longitudinal guidance, as is illustrated in FIG. 3.

In step 100, the driver assistance system 12 then ascertains, on the basis of the information from the navigation system 23, that an exit ahead must be taken.

Step 102 involves ascertaining the lane currently being traveled (here: the lane 10) and the target lane (here lane 32 of the exit) in order to follow the navigation destination (here the exit). This information can either be determined by the driver assistance system 12 itself and/or be determined with the aid of the navigation system 23. The lane currently being traveled can be determined for example by the vehicle sensor system present and by the total number of lanes communicated by the navigation device. Distances to roadside structures can be measured by the sensor system. In the case of small distances to a roadside structure, it can be assumed that the vehicle is in the respective outermost lane. Generally, the lane that the vehicle is in can be deduced from the distance to a roadside structure. The fact that the ego vehicle is in one of the respective outermost lanes can likewise be deduced from the identification of solid and broken lane boundary markings. The current lane can likewise be deduced by observing other vehicles and measuring primarily the transverse distance with respect to these vehicles. If the correct lane has been identified (the initial identification is always the most important and most difficult), then with lane boundary markings present it is always possible to identify lane changes and the current lane is always known.

The target lane is communicated to the driver assistance system 12 by the navigation system 23, for example.

Step 104 involves determining the number n (here n=3) of lane changes required from the current lane 10 to the target lane (here lane 32).

Step 110 involves estimating a distance $d_{sw}$ that is expected to be covered in the context of n−1 lane changes proceeding from the current lane to the lane 31 adjacent to the lane 32 of the exit.

For this purpose, by way of example, the intensity of the traffic volume of the surrounding traffic can be determined and, depending thereon, an average time $\Delta T$ for a lane change can be determined.

From the number n−1 of lane changes, the average time $\Delta T$ per lane change and an assumed vehicle speed v, in step 110 it is possible to determine the distance $d_{sw}=f(n; \Delta T; v)$ that is covered in the context of n−1 lane changes.

Furthermore, the distance d to the exit is determined in step 120. The distance d to the exit is, for example, the distance to the beginning of the lane 32 of the deceleration lane of the exit, as is indicated in FIG. 3.

The determination of the distance to the exit is then constantly updated.

In the position P1 in FIG. 3, the driver assistance system 12 knows the lane in which the vehicle 1 is currently situated (namely the lane 10) and the target lane (here the lane 32) to which it is necessary to change in order to follow the navigation destination (here the exit). Furthermore, the vehicle knows that n lane changes (here n=3) are required in order to follow the exit. Furthermore, the distance d to the exit and also the travel distance $d_{sw}$ for the n−1 lane changes are known.

A check is then made in the interrogation 130 to establish whether the current distance d to the beginning of the lane 32 of the exit is less than or equal to the distance $d_{sw}$ required for the n−1 lane changes plus a prior distance $\Delta d$. If this is the case, a for example optical lane-change indication is output to the driver in step 140. The prior distance $\Delta d$ takes account of the fact that the lane-change indication is not only output if the distance to the exit corresponds to the required distance $d_{sw}$ for the n−1 lane changes, but rather already earlier by the prior distance $\Delta d$. It would also be contemplated to dispense with a prior distance $\Delta d$.

Figure 4:
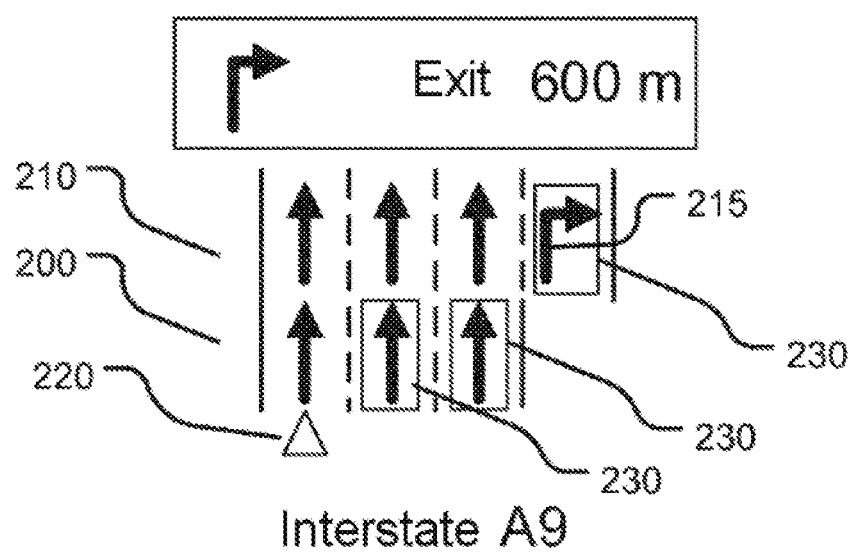
FIG. 4 shows an exemplary lane-change indication.

The outputting of the lane-change indication to the driver is carried out for example at the vehicle position P2 in FIG. 3. An exemplary optical lane-change indication is illustrated in FIG. 4. All the display elements illustrated in FIG. 4 are output for example only with the outputting of the lane-change indication at the vehicle position P2. In FIG. 4, the arrows mark the individual lanes. The arrows in the row 200 mark the lanes at the current position, and the arrows in the row 210 mark the lanes at the position of the exit, wherein the arrow 215 identifies the lane 32 of the exit. The marker 220 marks the lane currently being traveled. The lane changes required to reach the lane 32 of the exit are highlighted by the rectangular markings 230 of the lanes in FIG. 4. The marked arrows in the lower row 200 indicate which lane changes ought to be started at the current position in order to follow the navigation destination; the marked upper arrow 215 in the upper row 210 indicates the lane in which the vehicle 1 should be located after the required lane-change maneuver.

In reaction to the outputting of the lane-change indication, the driver assistance system 12 checks whether the driver carries out an operation action for triggering the n lane changes required on account of the navigation. Preferably, the operation action for the automated performance of the lane changes required on account of the navigation is different than the operation action for the automated performance of a single lane change. The operation action for the automated performance of the lane changes required on account of the navigation is, for example, the actuation of the turn signal lever 4 from the rest position to the engaged position, while a single lane change, independently of the current navigation, is triggered for example by switching from the rest position to the one-touch turn signal position.

In response to the operation action by the driver, n−1 lane changes from the starting lane 10 to the lane 31 adjacent to the lane 32 of the exit are performed successively taking account of the surrounding traffic in an automated manner by the driver assistance system 12 (see step 160). The performance of the n−1 lane changes begins at the position P3 in FIG. 3. The n−1 lane changes are performed taking account of the surrounding traffic if possible such that the exit can be reached in good time.

The n−1 lane changes are concluded at the position P4.

After reaching the beginning of the deceleration lane 32, a lane change from the lane 31 to the lane 32 of the exit is performed in an automated manner at the position P5 without the need for a further operation action.

If the exit does not have an additional deceleration lane, in step 110 it is possible to determine the distance $d_{sw}$ for n lane changes instead of n−1, such that all n lane changes required can be performed in an automated manner in step 160.

FIGS. 5A-B show different exemplary scenarios for automated performance of a plurality of lane changes in response to an operation action by a driver.

The automated performance of a plurality of lane changes in response to an operation action by a driver on account of an exit ahead has been described above (see e.g. FIG. 5B). The above-described explanations concerning the automated performance of a plurality of lane changes in response to an operation action by a driver can also be applied to the case of a different local lane-change cause ahead, for example a separation of lanes ahead and the lane changes associated therewith (see FIG. 5A). In FIGS. 5A-B, the arrows in each case indicate the lane that ought to be changed to in order to reach the destination with active navigation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for a motor vehicle for an automated performance of lane changes with at least automated transverse guidance, comprising:
    a lane-change assistance system, including a controller, which is operatively configured to:
    ascertain, based on information from a navigation system outputting a route, that a plurality of lane changes, proceeding from a current lane to a target lane, are required in order to follow the route;
    inform a driver of the vehicle of a need to change lanes;
    ascertain a presence of a triggering operation action by the driver for triggering the plurality of lane changes required; and
    in response to ascertaining the presence of the triggering operation action, perform successively and in an automated manner the plurality of lane changes required, proceeding from the current lane to the target lane, with at least automated transverse guidance, wherein only a single operation action is required for triggering the plurality of lane changes.

2. The system as claimed in claim 1, wherein the lane-change assistance system is configured to inform the driver of the need to change lanes, in response to ascertaining the plurality of lane changes required.

3. The system as claimed in claim 2, wherein the lane-change assistance system is further operatively configured to inform the driver of a need to change lanes such that the multiple lane changes necessary are signaled to the driver.

4. The system as claimed in claim 1, wherein a travel direction indicator operating element for activating a travel direction indicator visible from outside the vehicle is provided in the vehicle cockpit, and the triggering operation action by the driver is an actuation of the travel direction indicator operating element.

5. The system as claimed in claim 4,
    wherein the travel direction indicator operating element is a turn signal lever,
    wherein the turn signal lever has:
        (i) a rest position for a non-activated travel direction indicator,
        (ii) an engaged position, in which the travel direction indicator is permanently activated without the driver having to hold the turn signal lever, and
        (iii) before the engaged position, a one-touch turn signal position, in which the travel direction indicator is activated and returns to the rest position upon the turn signal lever being released, and
    wherein the triggering operation action is:
        (i) switching the turn signal lever from the rest position to the engaged position, or
        (ii) switching the turn signal lever from the rest position to the one-touch turn signal position, with the turn signal lever being held in the one-touch turn signal position for at least as long as until a specific criterion is satisfied.

6. The system as claimed in claim 1, wherein the lane-change assistance system is further operatively configured to ascertain that the plurality of lane changes is required on account of an exit ahead from the road currently being traveled, which exit is to be taken in the context of the navigation.

7. The system as claimed in claim 1, wherein the lane-change assistance system is further operatively configured to: determine or receive a distance with respect to a lane change cause ahead, in particular with respect to an exit ahead that is to be taken, and initiate informing the driver of the need for the lane change depending on the distance.

8. The system as claimed in claim 1, wherein the lane-change assistance system is further operatively configured to ascertain the current lane, wherein a point in time or the vehicle position at which the lane-change assistance system informs of the need for the lane change is dependent on the current lane.

9. The system as claimed in claim 8, wherein the lane-change assistance system is further operatively configured to, depending on the current lane, determine a number of lane changes to be performed proceeding from the current lane, wherein the point in time or the vehicle position at which the lane-change assistance system informs of the need for the lane change is dependent on said number.

10. The system as claimed in claim 1, wherein the lane-change assistance system is configured to determine or receive information concerning traffic volume of the surrounding traffic, wherein a point in time or the vehicle position at which the lane-change assistance system informs of a need for the lane change is dependent on the information concerning the traffic volume of the surrounding traffic.

11. A lane-change assistance method for a motor vehicle for automated performance of lane changes with at least automated transverse guidance, the method comprising the steps of:
    ascertaining, based on information from a navigation system outputting a route, that a plurality of lane changes proceeding from a current lane to a target lane are required in order to follow the route;
    informing a driver of a need to change lanes;
    ascertaining that a triggering operation action by the driver for triggering the plurality of lane changes required is present; and
    in response to ascertaining the presence of the triggering operation action, performing, in an automated manner, the plurality of lane changes required, proceeding from the current lane to the target lane,
    wherein only a single operation action is required for triggering the plurality of lane changes.

* * * * *